United States Patent [19]

Waymeyer et al.

[11] Patent Number: 5,259,569
[45] Date of Patent: Nov. 9, 1993

[54] ROLL DAMPER FOR THRUST VECTOR CONTROLLED MISSILE

[75] Inventors: Walter K. Waymeyer, LaVerne; Timothy P. Banach, Chino, both of Calif.

[73] Assignee: Hughes Missile Systems Company, Tucson, Ariz.

[21] Appl. No.: 834,183

[22] Filed: Feb. 5, 1992

[51] Int. Cl.$^5$ .............................................. F41G 7/00
[52] U.S. Cl. ................................. 244/3.22; 244/3.21
[58] Field of Search ................ 244/3.15, 3.21, 3.23, 244/3.24, 3.22; 318/585, 586; 364/435

[56] References Cited

U.S. PATENT DOCUMENTS

| | | | |
|---|---|---|---|
| 3,866,025 | 2/1975 | Cavanagh | 244/15 A |
| 3,946,962 | 3/1976 | Stallard | 244/3.21 X |
| 4,044,237 | 8/1977 | Cowgill et al. | 244/3.15 X |
| 4,173,785 | 11/1979 | Licata | 244/3.2 |
| 4,234,142 | 11/1980 | Yost et al. | 244/3.21 |
| 4,272,040 | 6/1981 | Bastian et al. | 244/3.22 |
| 4,274,610 | 6/1981 | Bastian | 244/3.22 |
| 4,590,567 | 5/1986 | Hofmann et al. | 244/3.21 |
| 5,094,406 | 3/1992 | Shafer | 244/3.21 |

*Primary Examiner*—Harold J. Tudor
*Attorney, Agent, or Firm*—Charles D. Brown; Randall M. Heald; Wanda K. Denson-Low

[57] ABSTRACT

A control system for thrust vector controlled (TVC) cruciform missiles having only pitch and yaw thrusters is disclosed wherein roll damping feedback signals are generated from bank angle data in a separate feedback loop with appropriate gain and compensation. Additional roll rate compensation is added to the missile pitch and yaw rate control subsystem by multiplying actual roll rate by pitch and yaw control deflections and inserting the resultant roll rate compensation command in the pitch and yaw rate error control loops. The addition of these two control feedback loops to the existing pitch and yaw thrust vector control system reduces roll rates caused by aerodynamic forces without the need for aerodynamic or reaction roll control means.

3 Claims, 7 Drawing Sheets

ROLL DAMPER FOR THRUST VECTOR CONTROLLED MISSILE

BACKGROUND OF THE INVENTION

Field of the Invention

The invention pertains generally to missile flight control systems and particularly to cruciform missiles subjected to aerodynamically-induced roll moments at high angles-of-attack, which are steered by pitch and yaw thrust vector control actuators alone, having (at low speeds and/or high angles-of-attack) no means for direct control of roll moment.

Description of the Related Art

A four-winged reaction and/or aerodynamically controlled cruciform missile is a body of revolution with four movable control surfaces or control fins in a cruciform array, and a two-axis (pitch and yaw) means for thrust vector control. During guided atmospheric flight, a missile may be required to maneuver in any lateral direction during an interception of target and may experience angles-of-attack of any value, including 90° during a turnover maneuver at low velocity.

At low angles of attack with effective aerodynamic control the steering (yaw and pitch) and roll characteristics of a cruciform missile are essentially independent. Rotation of the missile about its longitudinal axis (roll) has no significant effect on steering direction and, conversely, steering maneuvers in pitch or yaw have negligible effect on missile roll. At higher angles of attack, a systematic and periodic roll moment exists as a function of bank angle as is well-known in the art. This cross-coupling phenomenon occurs because of aerodynamic forces exerted on the cruciform fixed wing and control fin array which act to cause roll moments as functions of the pitch and/or yaw angles-of-attack. Bank angle is a function of pitch and yaw angles-of-attack; specifically, the arctangent of yaw angle-of-attack divided by pitch angle-of-attack. The primary aerodynamic phenomenon responsible for these roll moments is the asymmetric loading of the fixed wings and controls. The asymmetric loading produce roll moments which increase with the sine of the angle-of-attack. Another interpretation of this aerodynamic phenomenon which contributes to these roll moments is the increase in pressure differential between the windward and leeward side of the fixed and control surfaces at angles-of-attack.

The problem of aerodynamic cross-coupling is well-known in the art and is generally considered to be an undesirable effect of missile aerodynamics. Many practitioners in the art have proposed methods for eliminating or compensating for the effects of aerodynamic cross-coupling at high angles-of-attack. The simplest solution to the problem of unwanted roll moments is to avoid missile operations at large angles-of-attack. Heretofore this was the only available aerodynamic solution in in the absence of a separate roll control thrust vector because the typical aerodynamic roll control, a separate fin, is ineffective at low velocities and unreliable and unpredictable at angles-of-attack approaching 90°. Adding reaction roll moment generation is undesirable because providing a separate roll control thrust vector system, such as a reaction motor, is expensive in terms of dollars, weight and complexity, often the only workable non-aerodynamic solution is to avoid missile operation at large angles-of-attack.

U.S. Pat. No. 3,946,968 issued to Stallard discloses an improved flight control system for use in cruciform guided missiles which measures the lift force and roll moment for each individual control surface. A computer uses these forces and moments to compute a set of compensating forces necessary to equalize the aerodynamic force on each of the steering and roll control fins. Stallard developed this improved flight control system to allow any desired steering maneuver, either in pitch or yaw (or both) without causing other unwanted rolling motions from aerodynamic cross-coupling. However, his system requires a roll autopilot to issue the control fin roll moment commands required to maintain a preferred roll orientation of the missile and does not consider the problem of eliminating roll moments caused by aerodynamic cross-coupling when no aerodynamic or reaction roll control is available. Stallard's system improves steering and roll control stability at higher attack angles using aerodynamic yaw, pitch and roll control fins, but does not consider the problem of roll stabilization at high attack angles for thrust vector control guided missiles.

U.S. Pat. No. 4,044,237 issued to Cowgill et al. describes a novel concept for minimizing the aerodynamic cross-coupling problem at high angles-of-attack by using an ellipsoidal missile body. Cowgill's lifting body missile is controlled by pitch and roll commands that change in accordance with missile roll and angle-of-attack. The flattened lifting body is steered by the pitch and roll controllers and the yaw axis controller serves primarily to decouple the steering axis. This contrasts with the cruciform missile body which is steered by the pitch and yaw controllers with the roll controller employed primarily to decouple the steering axis. Although Cowgill solves the problem of aerodynamically-induced roll moments at high angles of attack, his method is not applicable to cruciform missiles having bodies of circular cross section wings.

U.S Pat. No. 4,173,785 issued to Licata discloses an electronic guidance system which functions without an active roll control by continuously pointing the velocity vector toward the target position. Licata's electronic guidance system requires the insertion of target position coordinates prior to launch, without which the system will not function. By reducing the guidance problem to two dimensions, Licata reduces the complexity of the initial platform guidance system and eliminates the need for an active roll controller. Licata doesn't address the problem of reducing aerodynamic roll moments at large angles-of-attack in a cruciform missile where no external target localization system data are available.

U.S. Pat. No. 4,234,142 issued to Yost et al. discloses a missile control system that obtains control stability at high angles of attack by cross-coupling the roll and steering sensor signals. This method allows the control system to respond at high angles-of-attack with response times, bandwidths and stability similar to those normally available at low angles-of-attack. This is accomplished by inserting roll sensor signals into the steering (yaw and pitch) controller and inserting steering sensor signals into the roll controller at angles-of-attack greater than a specified amount. Yost's missile control system does solve the problem of aerodynamic roll moments at large angles-of-attack. He uses a separate roll control system to accomplish this. Without a separate roll controller, Yost et al. are unable to reduce the effects of roll moments at large angles-of-attack.

The above and other developments known in the art serve to demonstrate the importance of the aerodynamic cross-coupling problem at large angles-of-attack for the cruciform missile guidance control system. Although this is an important problem well-known in the art, means for eliminating the effects of aerodynamic roll moments at large angles-of-attack, in a cruciform guided missile having no independent roll control means, are presently unknown.

SUMMARY OF THE INVENTION

The present invention is a method and apparatus for the damping and control of roll moments in a cruciform guided missile system through the use of pitch and yaw thrust vector control (TVC) actuators alone. An advantage of the present invention is that roll moments can be controlled at any angle-of-attack without the expense or weight of a roll reaction control thruster. Another advantage of the present invention is the availability of stable roll moment control and damping at high angles-of-attack where aerodynamic roll stabilizers and controls are unpredictable and unreliable. This capability allows a cruciform missile to operate at high angles-of-attack despite severe cross-coupling between steering and roll aerodynamic controls. Yet another advantage of the present invention is the capability of switching out the disclosed roll damping system at low angles-of-attack where conventional aerodynamic roll control surfaces can sufficiently dampen the relatively small cross-coupled roll moments occurring there.

The method and apparatus of the present invention is easily implemented using standard autopilot components and capabilities. The illustrated embodiment merely adds an additional control loop to an existing autopilot using components and techniques well-known in the art. The essential feature of the present invention is the control of roll moment using only the pitch and yaw (TVC) actuators or thrusters by creating TVC rate control signals in response to a computed bank angle. These TVC rate control signals adjust the pitch and yaw thrust to adjust bank angle to produce damping roll moments to reduce the measured roll rate. Another essential feature of the present invention is the resulting decoupling of pitch and yaw thrust vector control systems from any rolling motion that occurs. The bank angle is adjusted at a rate proportional to the bank angle itself in a second stable control loop.

The novel features that are considered characteristic of the present invention are set forth with particularity in the appended claims. The invention itself as well as additional objects and advantages thereof will be best understood from the following description of the illustrated embodiment.

BRIEF DESCRIPTION OF THE DRAWINGS

Other objects and the intended advantages of the present invention will be readily apparent as the invention is better understood by reference to the following detailed description with the appended claims when considered in conjunction with the accompanying drawings, wherein:

FIG. 8 provides the complete Symbol Definition Table I.

DESCRIPTION OF THE PREFERRED EMBODIMENT

Figure 1:
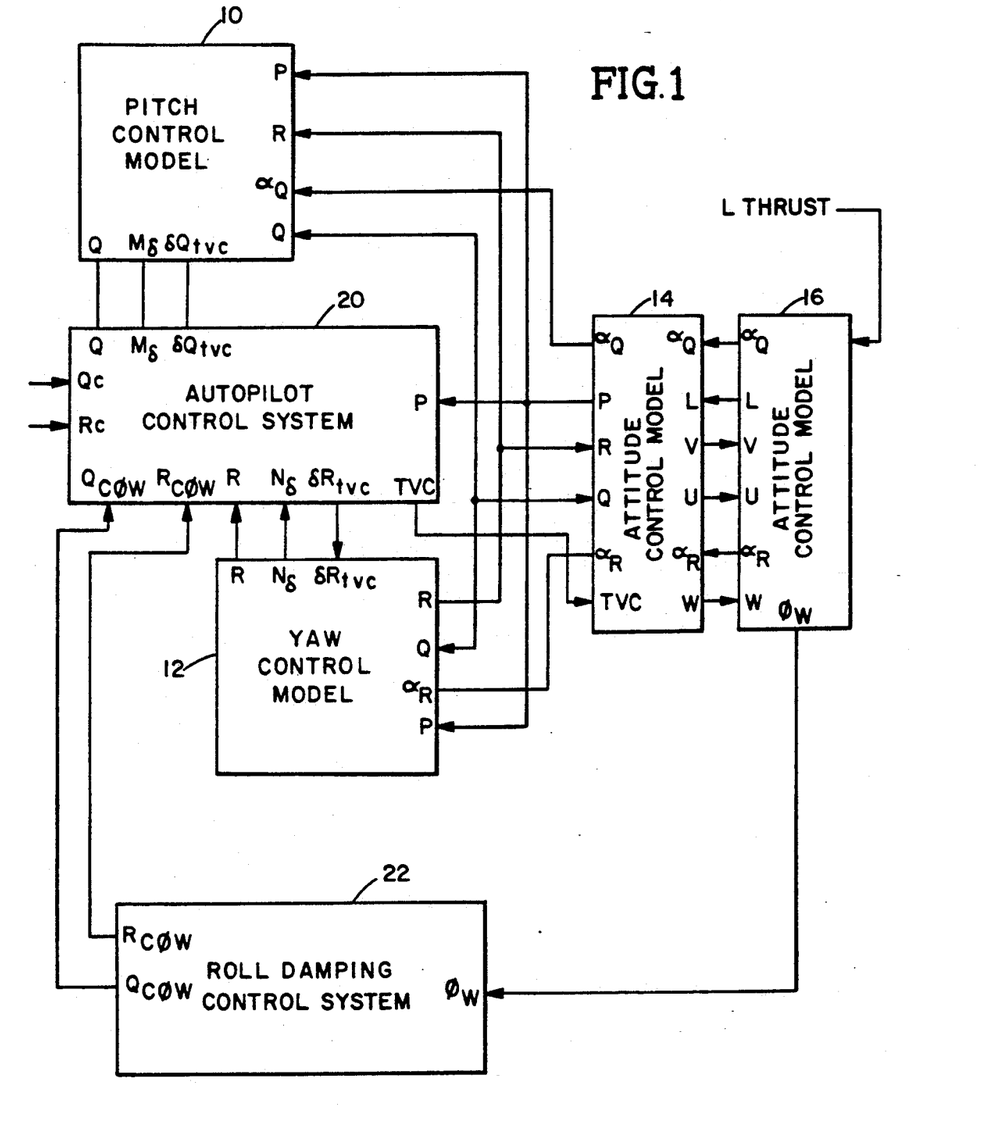
FIG. 1 is a block diagram schematic illustrating an embodiment of the present invention together with a schematic model of the physical laws governing the interaction of the cruciform missile with the aerodynamic and physical environment.

The present invention is best illustrated in its preferred embodiment by considering the cruciform guided missile control system together with its relationship to the missile body and the aerodynamic environment. Accordingly, referring to FIG. 1, we consider a block diagram containing natural and artificial elements. The artificial elements represent the transformation of dynamic states into measurements. These measurements are further transformed into physical action through artificial electronic elements and actuator systems, which transform electrical signals into physical forces and comprise the thrust vector control system. FIG. 1 comprises both artificial elements and elements that schematically represent natural dynamic processes. The present invention can be best understood as an implementation of a method for transforming measurements into action.

In FIG. 1, the pitch thrust vector control model 10 and the yaw thrust vector control model 12 are merely natural solutions to the equations of motion for a guided missile as are well-known in the art. These equations relate the missile attitude and angle-of-attack to the position and effectiveness of the pitch and yaw thrusters. Pitch system 10 is illustrated in detail in FIG. 2 and yaw system 12 is illustrated in detail in FIG. 4. The definition of all mathematical variables illustrated in the drawings is provided in FIG. 8 Table I.

Figure 2:
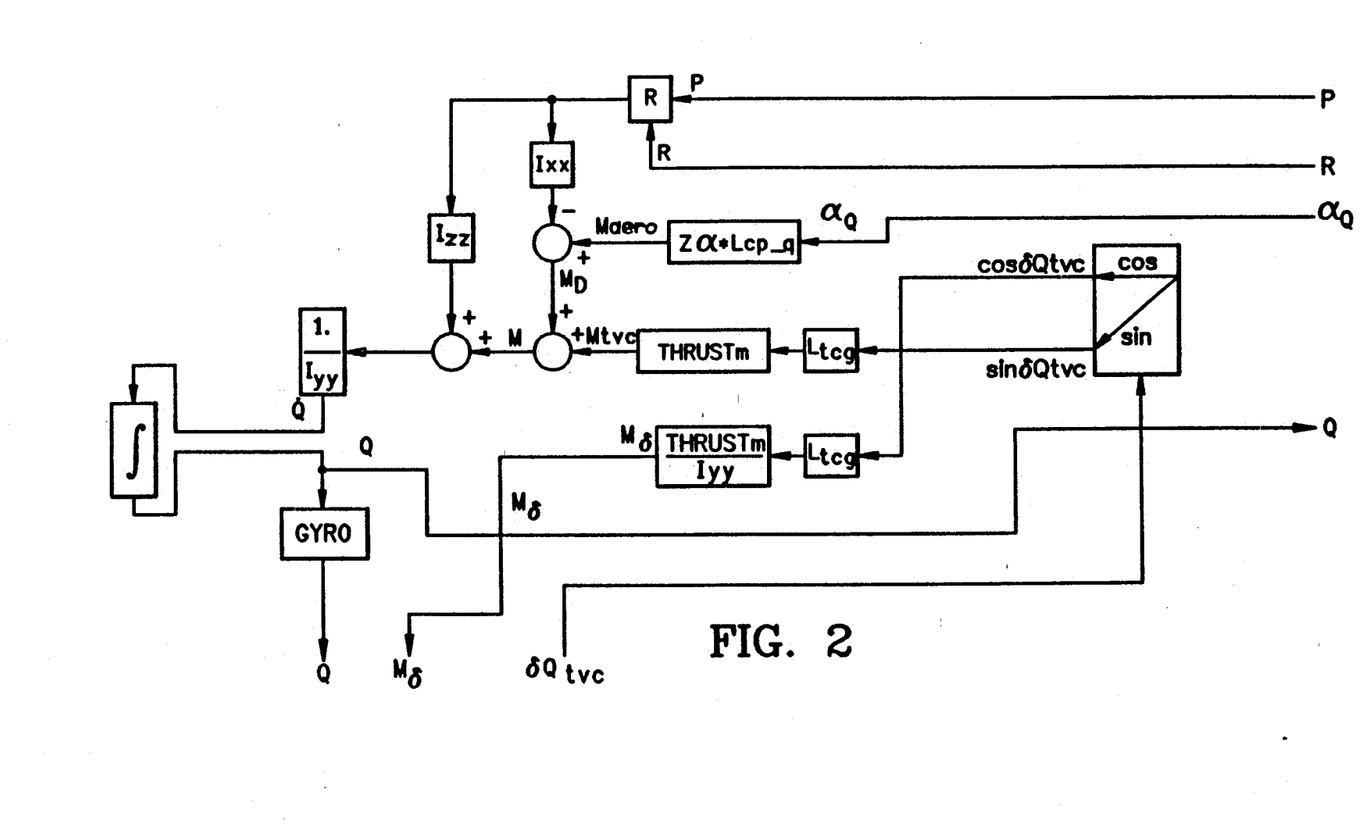
FIG. 2 is a schematic representation of the mathematical model for the natural solution of the equations of motion for a guided missile as a function of the position of the pitch thrust vector control system.
Figure 4:
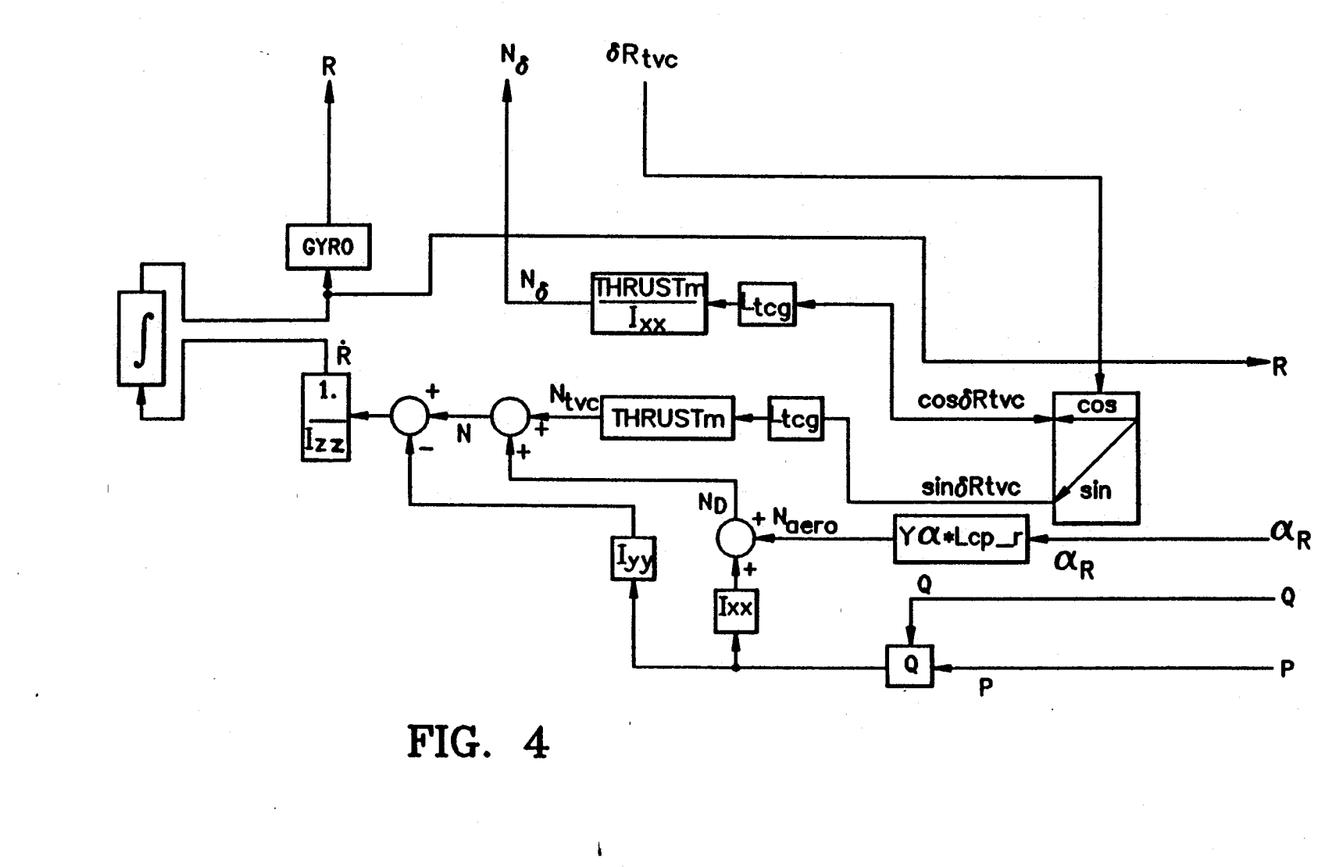
FIG. 4 is a schematic representation of the mathematical model for the nature solution of the equations of motion for a guided missile as a function of the position of the yaw thrust vector control system.

Referring briefly to FIG. 2, pitch rate Q, TVC control effectiveness $M_\delta$ are determined from roll P, yaw rate R, pitch angle-of-attack $\alpha_Q$, and nozzle deflection $\delta Q_{rvc}$. Similarly, in FIG. 4, yaw rate R, yaw control effectiveness $N_\delta$ are determined from roll rate P, pitch rate Q, yaw angle-of-attack $\alpha_R$, and nozzle deflection $\delta_{RTVC}$. The natural equations of motion represented schematically in FIGS. 2 and 4 are well understood by practitioners in the art. For instance, refer to *Guided Weapon Control Systems*, P. Garnell, Pergammon Press, 1987 Edition. Also, refer to *Aircraft Dynamics and Automatic Control*, McRuer, Ashkenas and Graham, Princeton University Press, New Jersey, 1973.

Figure 6:
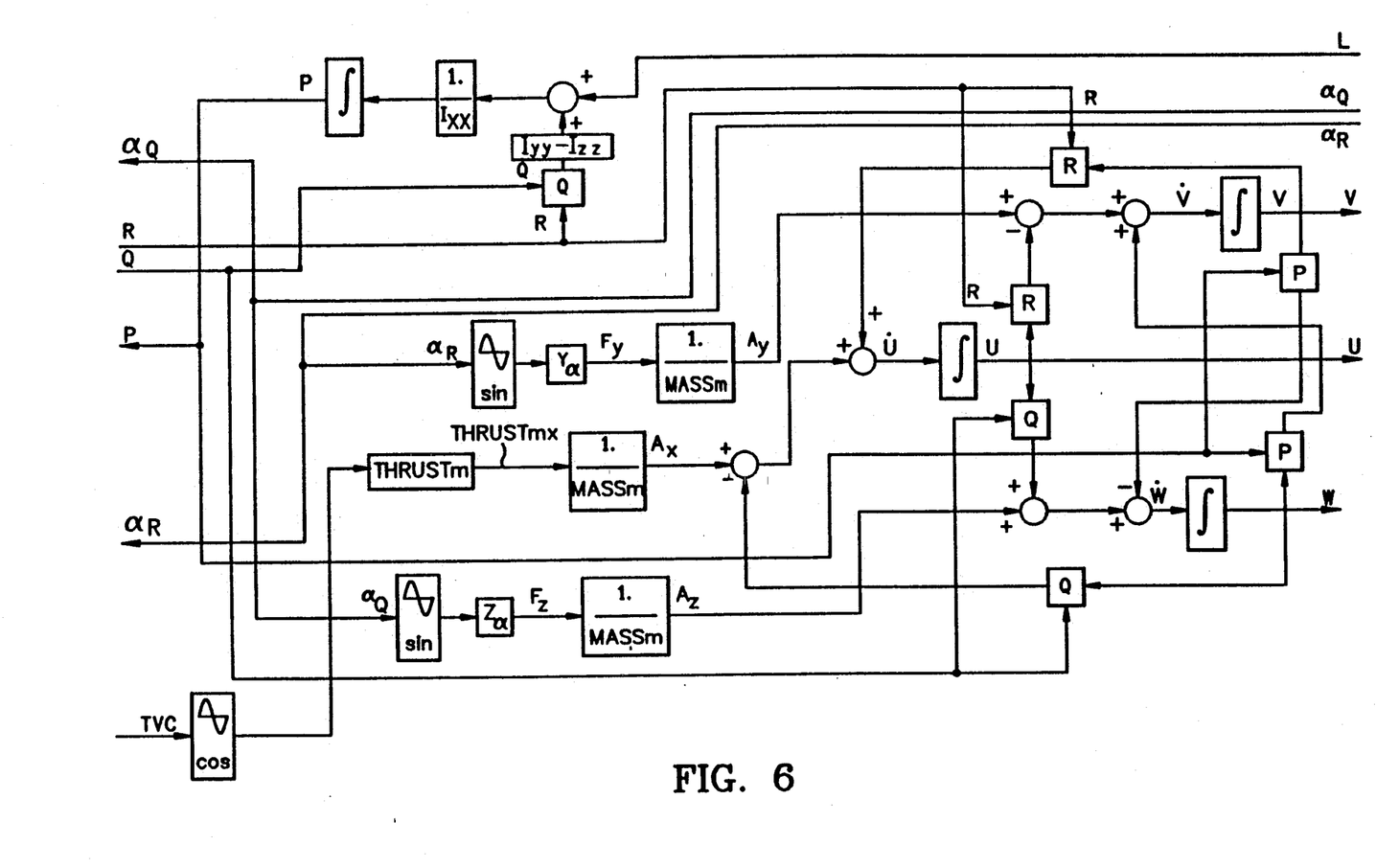
FIG. 6 is a schematic representation of the natural solution of the equations of relating the guided missile attitude vectors to the angles-of-attack and thrust vectors.
Figure 7:
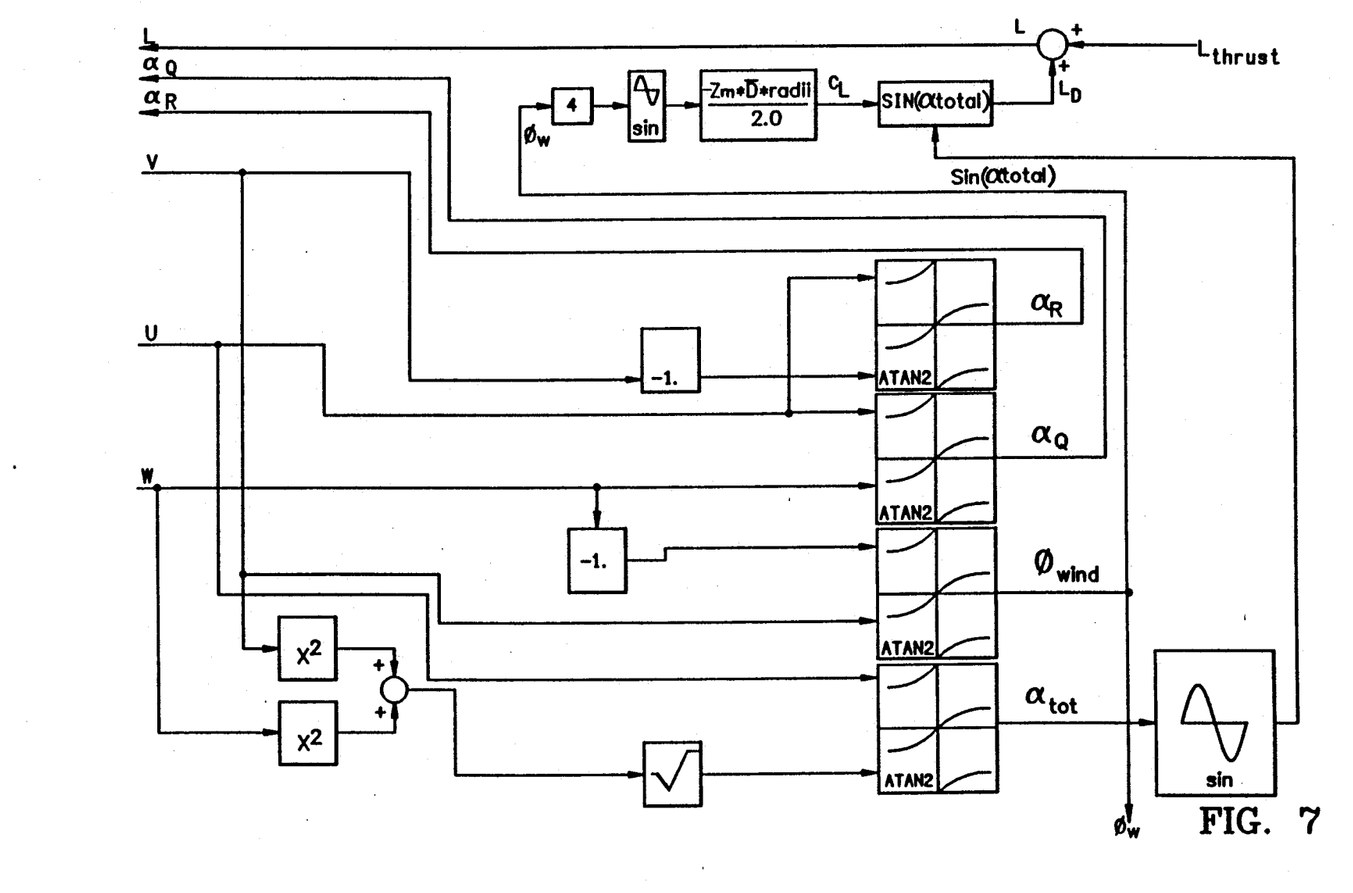
FIG. 7 is a schematic representation of the solution of the natural equations of motion relating the thrust vectors of the guided missile to the bank angle (cross-flow angle) of the wind.

Referring again to FIG. 1, the first thrust vector attitude control model 14 and the second thrust vector attitude control model 16 are schematic representations of the equations of motion relating the thrust vectors and bank angle to the guided missile angle-of-attack and attitude angles. Model 14 is illustrated in detail in FIG. 6 and model 16 is illustrated in detail in FIG. 7. Referring briefly to FIG. 6, note that total thrust vector control angle TVC, angle-of-attack pitch component $\alpha_Q$, angle-of-attack yaw component $\alpha_R$, pitch Q, roll P, and yaw R are all related to intermediate variables L, V, U, and W. In FIG. 6, rates of change of velocity components U, V and W, along with roll rate P, are determined as a function of the angle of attack pitch and yaw components $\alpha_Q$ and $\alpha_R$, rolling moment L, thrust vector control angle TVC and physical characteristics of the missile. Referring briefly to FIG. 7, intermediate variables L, V, U, and W are related to the angle-of-attack pitch and yaw components $\alpha_Q$ and $\alpha_R$ with thrust amplitude $L_{thrust}$ and bank angle (cross-flow angle of the wind) $\phi_{wind}$. In FIG. 7, the resulting velocity components U, V and W, along with $L_{thrust}$, rolling moment caused by thrust vector misalignment with the missile's roll axis, are used to determine angle-of-attack pitch and yaw components $\alpha_Q$ and $\alpha_R$, rolling moment L, and bank angle $\phi_w$. As with models 10 and 12, the natural equations of motion represented by models 14 and 16 are well known in the art and can be understood by referring to the references cited above together with the symbol definition Table I in FIG. 8.

In FIG. 1, the autopilot control system 20 accepts pitch rate command $Q_c$ and yaw rate command $R_c$ from a guidance computer control means (not shown) and provides a thrust vector control signal TVC, which is a total thrust vector angle comprising components in the pitch and yaw planes. System 20 is illustrated in detail in FIG. 3. Roll damping control system 22 accepts a bank angle $\phi_w$ input and provides roll damping pitch rate command $Q_{c\phi w}$ and roll damping yaw rate command $R_{c\phi w}$, which are forwarded to autopilot control system 20. System 22 is disclosed in detail in FIG. 5.

Figure 5:
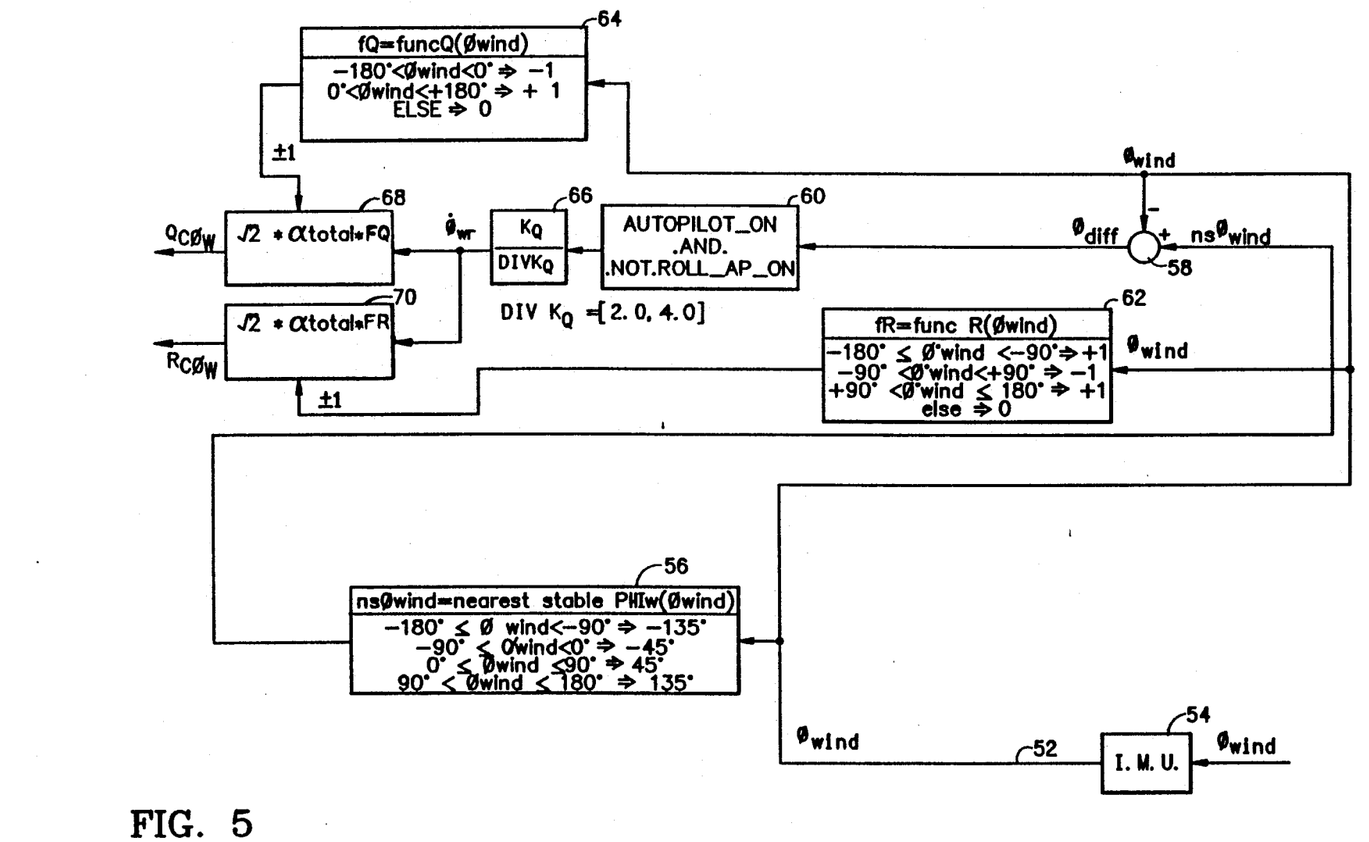
FIG. 5 is a schematic representation of the method used in the preferred embodiment for deriving the roll damping pitch and yaw rate commands from the actual bank angle.

Generally, the measurements aboard the guided missile include vector control deflection and body rates and accelerations as measured by rate sensors and accelerometers, processed by the computational power normally available in a standard Inertial Measurement Unit (IMU). In FIG. 5, the IMU is shown as the source of the bank angle $\phi_{wind}$. U, V, and W (as measured by the IMU) available for use in the present invention are the missile velocity component (assumed to be with respect to a substantially still atmosphere) resolved into body-fixed coordinates. Using these velocities in missile-body coordinates, the angle-of-attack $\alpha$ and the bank angle $\phi_{wind}$ are computed in a well-known fashion. With this information, a reasonable estimate of the aerodynamic forces and moments acting on the guided missile airframe is available at all times. The control system illustrated in FIG. 5 embodies the central feature of the present invention, which is the creation of thrust vector control rates that damp the missile's rolling motion in response to computed bank angle $\phi_{wind}$. An associated feature of system 22 is the resulting decoupling of the pitch and yaw systems from unwanted and unintended rolling motion, which is a well-known problem with cruciform guided missiles.

Figure 3:
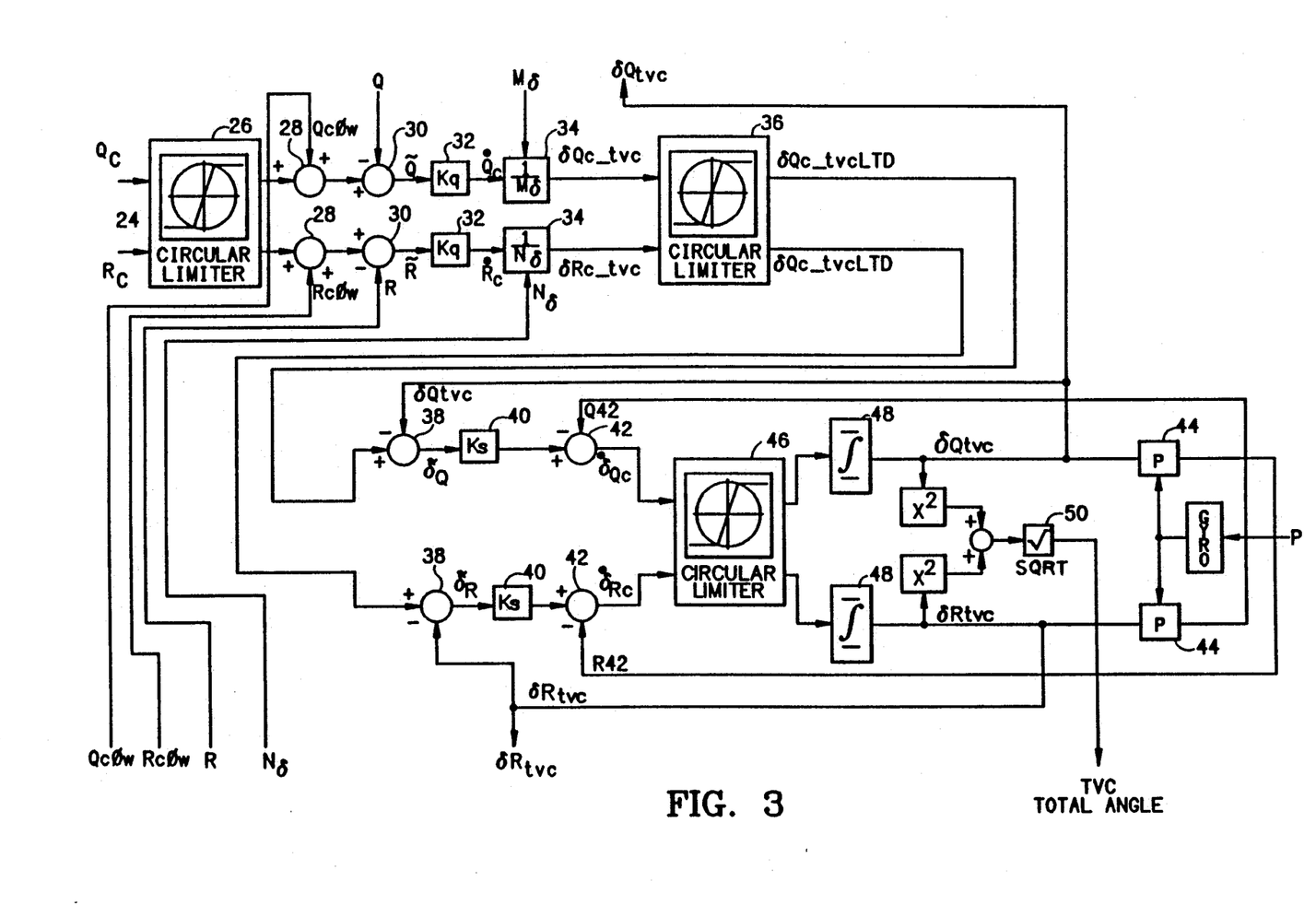
FIG. 3 is a schematic representation of the illustrated embodiment of the present invention incorporated in an autopilot control system.

Referring to FIG. 3, the present invention is included in a pitch-over control system that accepts the pitch and yaw (angular accelerator) rate commands $Q_c$ and $R_c$. These commands enter system 20 at 24 and are limited by the circular limiter 26. Limiter 26 acts to preserve vector direction while limiting total nozzle deflection.

A key feature of the present invention is the generation of the additional commands, in body coordinates, inserted at 28. These roll damping pitch rate $Q_{c\phi w}$ and yaw rate $R_{c\phi w}$ commands are generated by system 22 in FIG. 5. The roll damping commands and rate commands are summed at 28. The sums are interpreted by the autopilot as angular rate commands in body coordinates. The actual body rates, obtained from rate gyros, are subtracted at 30 to create rate errors Q and R in body coordinates.

To remove errors $\tilde{Q}$ and $\tilde{R}$ with a $1/K_q$ time constant, the errors are multiplied by the gain $K_q$ at 32. To equalize the control loop at gain $K_q$, rate commands $Q_c$ and $R_c$ are divided by the control effectiveness $M_\delta$ and $N_\delta$ associated with pitch and yaw controls. This division occurs at 34, producing pitch and yaw control deflection commands $\delta Q_c - _{tvc}$ and $\delta R_c - _{tvc}$. These control deflection commands are circularly limited at 36 to produce the limited control deflection commands $\delta Q_c - _{tvcLTD}$ and $\delta R_c - _{tvcLTD}$. The actual control deflections $\delta Q_{tvc}$ and $\delta R_{tvc}$, as measured by missile instrumentation, are subtracted from these limited control deflections at 38 to provide $\tilde{\delta}_Q$ and $\tilde{\delta}_R$. To remove these control deflection errors in $1/K_S$ seconds, deflection errors $\delta_Q$ and $\delta_R$ are multiplied by loop gain $K_S$ at 40.

Another important and novel feature of the present invention is the roll rate compensation $R_{42}$ and $Q_{42}$ added at 42. This compensation is generated at 44 by multiplying actual roll rate P, as sensed by a rate gyro, by the pitch and yaw control deflections $\delta Q_{tvc}$ and $\delta R_{tvc}$ at 44. Roll rate compensations $R_{42}$ and $Q_{42}$ are subtracted from the amplified deflection errors at 42 and the resultant control deflection rate commands $\delta_{Qc}$ and $\delta_{Rc}$ are circularly limited at 46.

The circular limiting of the commanded control deflection rates at 46 preserves vector direction while limiting total nozzle deflection. The limited control deflection rate commands are then executed in the control servos at 48. Total thrust vector control angle TVC is shown schematically as equal to the square root of the sum of the squares of the actual pitch and yaw control deflections $\delta Q_{tvc}$ and $\delta R_{tvc}$ at 50.

We see that the illustrated embodiment in FIG. 3 accepts pitch and yaw rate commands $Q_c$ and $R_c$ at 24 and issues thruster deflection commands at 48 which result in actual pitch and yaw control deflection values $\delta Q_{tvc}$ and $\delta R_{tvc}$. To accomplish this, the system in FIG. 3 uses actual yaw and pitch R and Q from the gyro, yaw and pitch control effectiveness ratios $N_\delta$ and $M_\delta$ and roll damping pitch and yaw rate commands $Q_{c\phi w}$ and $R_{c\phi w}$, which are generated by system 22 as shown in FIG. 5.

System 22 in FIG. 5 is that portion of the present invention which computes the roll damping commands as a function of the IMU bank angle $\phi_{wind}$ of the guided missile. Although the actual rolling moment, expressed as a function of $\phi_{wind}$ and total angle-of-attack $\alpha_{total}$, may require a complex description, the key characteristics of these moments can be captured for the purpose of this disclosure by using the following simple concepts. The roll moment of interest varies substantially sinusoidally with bank angle $\phi_{wind}$ and is proportional to the sine of the total angle-of-attack $\alpha_{total}$. The sinusoidal nature of this roll moment means that the value repeats every 90° of bank angle. Hence, there is a stable roll orientation every 90° where the roll moment magnitude passes through zero. There is also a marginally stable roll orientation every 90° that is offset from the stable roll orientation by 45°, where the roll moment passes through zero. With this simple conceptual illustration we add the important notion that bank angle $\phi_{wind}$ can be changed by rolling the missile about its center line, or by yawing the missile's center line at non-zero pitch angles-of-attack.

System 22 in FIG. 5 is an important part of the present invention which generates the roll damping rate commands $Q_{c\phi w}$ and $R_{c\phi w}$. These are used in system 20 to dampen roll moments by adjusting pitch and yaw rate commands $Q_c$ and $R_c$. Referring to FIG. 5, bank angle $\phi_{wind}$ at 52 is determined by the IMU 54 assuming that the atmospheric wind velocity is zero. The nearest stable bank angle to which the system should be allowed to drift by rolling in response to the naturally induced roll moment is determined by the simple logic 56. This logic 56 selects a stable bank angle value of $-135°$ if the present bank angle is between $-90°$ and $-180°$. Similarly, for bank angles between $+90°$ and $+180°$, a stable value of 135° is selected. Alternatively, for bank angles between 0° and $\pm 90°$, a stable bank angle value of $\pm 45°$ is selected. The purpose of this logic 56 is merely to select the nearest stable bank angle position.

At 58, the angular error between the actual bank angle $\phi_{wind}$ and the desired stable bank angle value $ns\phi_{wind}$ is calculated to be $\phi_{diff}$ using simple subtraction. A simple logic 60 decides whether the damping loop should be closed or disabled. Logic 60 disables the roll damper if the pitch and yaw autopilots are off or if the roll autopilot using aerodynamic surfaces for roll control is on. For example, if the angle-of-attack is so large that the aerodynamic control effectiveness is completely unreliable, logic 60 will close the loop and activate roll damping control signals for the reaction control actuators and moment generators.

At logic 62 and logic 64, the signs of the yaw and pitch components of the bank angle $\phi_{wind}$ are determined. The sign of the yaw roll damping control signal $f_R$ is positive for bank angles between $+90°$ and $+180°$ and between $-90°$ and $-180°$. The sign of $f_R$ is negative for bank angles between $+90°$ and $-90°$. Similarly, as seen in FIG. 5, the sign of the pitch roll damping rate command $f_Q$ is $-1$ for bank angles between 0° and $-180°$ and $+1$ for bank angles between 0° and $+180°$.

Conceptually, a bank angle rate command proportional to the error in bank angle $\phi_{diff}$ is generated at 66. A potential stability and transient response problem exists at 66 if gain $K_q/DIVK_q$ is too high with respect to $K_q$. As a guide for preliminary design, the quantity $DIVK_q$ is set in the range from 2.0 to 4.0. $K_q$ is the loop gain of the rate control loop while $K_q/DIVK_q$ is the gain in the attitude control loop. The exact value of $DIVK_q$ can be set by a qualified control system designer to maintain required stability constraints in a detailed design using techniques well-known in the control arts.

The control loop is gain-compensated at 68 and 70. Because pitch and yaw rate affects bank angle in inverse proportion to the total angle-of-attack $\alpha_{total}$, the loop gain is regulated by inserting the additional gains proportional to the total angle-of-attack $\alpha_{total}$ at 68 and 70. The commands at 68 ($Q_{c\phi w}$) and 70 ($R_{c\phi w}$) are the roll damping pitch and yaw rate commands sent to system 20, where they are summed with pitch and yaw rate commands $Q_c$ and $R_c$ at 28 in FIG. 3.

It will be appreciated that we have described a system which adds damping to the roll control system by appropriate manipulation of the pitch and yaw thrust actuators. The essence of the invention is inherent in the recognition that the roll moment P can be adjusted by changing the bank angle $\phi_{wind}$ and that bank angle $\phi_{wind}$ can be adjusted at a rate proportional to the bank angle itself in a loop with appropriate gain and compensation (system 22 in FIG. 5). Obviously, other embodiments and modifications of the present invention will occur readily to those of ordinary skill in the art in view of these teachings. Therefore, this invention is to be limited only by the following claims, which include all such obvious embodiments and modifications when viewed in conjunction with the above specification and accompanying drawings.

TABLE I

Symbol Definitions $A_x$ = Acceleration Along Missile Centerline $A_y$ = Acceleration Normal to Missile Centerline, Yaw Plane $A_z$ = Acceleration Normal to Missile Centerline, Pitch Plane $C_L$ = Rolling Moment Coefficient $\bar{D}$ = Reference Length (Aerodynamic Reference Length)

$DIVK_Q$ = [2.0, 4.0], An Arbitrary Constant $f_Q$ = Sign of $Q_{c\phi w}$ Computed from Actual Bank Angle $f_R$ = Sign of $R_{c\phi w}$ Computed from Actual Bank Angle $F_y$ = True Normal Force in Yaw Plane $F_z$ = True Normal Force in Pitch Plane $I_{xx}$ = Roll Moment of Inertia $I_{yy}$ = Moment of Inertia About Yaw Axis $I_{zz}$ = Moment of Inertia About Pitch Axis $K_q$ = Rate Control Loop Gain $K_s$ = Thrust Control Deflection Error Correction Gain $L = L_{thrust} + L_D$ $L_{cp-q}$ = Distance Between Center of Pressure and Missile Cg. (Pitch Moment Arm)

$L_D$ = Aerodynamically Induced Roll Moment $L_{tcg}$ = Distance Between Thrust Source and Missile Cg. (TVC Control Arm)

$L_{thrust}$ = Roll Moment Resulting From Thrust Offset from Missile Centerline

M = True Yaw Moment $MASS_m$ = Mass of Missile $M_{acro}$ = Pitch Moment Resulting from Pitch Angle-of-Attack $M_D$ = Aerodynamically Induced Pitching Moment $M_g$ = Not Used $M_{tvc}$ = Yaw Moment Resulting from TVC Nozzle Deflection in Yaw Plane $M_\delta$ = Pitch Control Effectiveness Ratio $N_{acro}$ = Yaw Moment Resulting from Yaw Angle-of-Attack $N_D$ = Aerodynamically Induced Yawing Moment $ns\phi_{wind}$ = Desired Bank Angle = Nearest Stable $PHI_w(\phi_{wind})$ $N_\delta$ = Yaw Control Effectiveness Ratio P = True Body Roll Rate Gyro Output $PHI_w(\phi_{wind})$ = Stable Bank Angle Value as a Function of Measured Bank Angle Q = True Body Pitch Rate Gyro Output $\bar{Q}$ = True Body Pitch Angular Acceleration $\tilde{Q} = Q_c + Q_{c\phi w} - Q$ = Pitch Rate Error in Body Coordinates
$Q_c$ = Pitch Rate Command
$\dot{Q}_c = K_q \times \tilde{Q}$ = Pitch Angular Acceleration Command
$Q_{c\phi w}$ = Roll Damping Pitch Rate Command
$Q_{42} = P \times \delta Q_{tvc}$ = Pitch Component of Roll Rate Compensation
$R$ = True Body Yaw Rate Gyro Output
$\dot{R}$ = True Body Yaw Angular Acceleration
$\tilde{R} = R_c + R_{c\phi w} - R$ = Yaw Rate Error in Body Coordinates radii = Roll Moment Arm in Terms of Missile Body Radius
$R_c$ = Yaw Rate Command
$\dot{R}_c = K_q \times R$ = Yaw Angular Acceleration Command
$R_{c\phi w}$ = Roll Damping Yaw Rate Command
$R_{42} = P \times \delta R_{tvc}$ = Yaw Component of Roll Rate Compensation
$THRUST_m$ = Total Thrust Force Produced by Missile Motor
$THRUST_{mx}$ = Component of Thrust Along Missile Centerline
$TVC = [\delta Q_{tvc}^2 + \delta Rtvc2]^{\frac{1}{2}}$ = Total Thrust Vector Control Angle
$U$ = Velocity Component Along Missile Centerline
$V$ = Velocity Component Normal to Missile Centerline, Yaw Plane
$W$ = Velocity Component Normal to Missile Centerline, Pitch Plane
$Z_\alpha$ = Normal Force Coefficient
$\alpha_Q$ = Pitch Component of the Angle-of-Attack
$\alpha_R$ = Yaw Component of the Angle-of-Attack
$\alpha_{total}$ = Total Angle-of-Attack
$\delta Q = \delta Q_{c-tvcLTD} - \delta Q_{tvc}$ = Pitch Control Deflection Error
$\delta Q_c$ = Pitch Control Deflection Rate Command
$\delta Q_{c-tvc} = Q_c/M_\delta$ = Pitch Control Deflection Command
$\delta Q_{c-tvcLTD}$ = Circularly Limited Pitch Control Deflection Command
$\delta Q_{tvc}$ = Actual Pitch Control Deflection
$\delta R = \delta R_{c-tvcLTD} - \delta R_{tvc}$ = Yaw Control Deflection Error
$\delta R_c$ = Yaw Control Deflection Rate Command
$\delta R_{c-tvc} = R_c/N_\delta$ = Yaw Control Deflection Command
$\delta R_{c-tvcLTD}$ = Circularly Limited Pitch Control Deflection Command
$\delta R_{tvc}$ = Actual Yaw Control Deflection
$\phi_{diff} = ns\phi_{wind}$ = Bank Angle Error
$\phi_w = \phi_{wind}$ = Bank Angle (Cross-Flow Angle) of the Wind
$\dot{\Phi}_{wc}$ = Bank Angle Rate Command

We claim:

1. In a pitch and yaw rate subsystem of a thrust vector controlled (TVC) missile, a control system for damping actual roll rate solely by deflecting a pitch and yaw thrust vector nozzle, said subsystem producing pitch and yaw deflection rate commands for deflecting said thrust vector nozzle and having an inertial measurement unit (IMU) for providing signals representing actual pitch, yaw, and roll rates, said control system comprising:

means for computing a bank angle from said IMU signals, said bank angle having a pitch component and a yaw component;

selection means for choosing a stable bank angle to which said missile will be allowed to drift;

means for computing the sign of said pitch component of said computed bank angle and for computing the sign of said yaw component of said bank angle;

difference means for computing a bank angle error between said stable bank angle and said compute bank angle;

first multiplier means for providing a bank angle rate signal proportional to said bank angle error, said bank angle rate signal having a pitch component and a yaw component;

second multiplier means for producing a pitch rate roll damping command in response to said pitch component of said bank angle rate signal and said sign of pitch component of said computed bank angle, for producing a yaw rate roll damping command in response to said yaw component of said bank angle rate signal and said sign of said yaw component of said computed bank angle, and for gain-compensating said roll damping commands by adjusting the magnitudes of said roll damping commands in response the angle-of-attack of said missile; and summing means for adding said gain-compensated pitch rate roll damping commands to said pitch deflection rate commands and for adding said gain-compensated yaw rate roll damping commands to said yaw deflection rate commands.

2. The roll damping system of claim 1, further comprising:

feedback means for introducing roll rate compensation of said pitch and yaw control deflection rate signals; and limiting means for preserving thrust vector direction while limiting deflection of said nozzle in response to said roll rate compensated pitch and yaw control deflection rate signals.

3. A method for adjusting the roll moment of a thrust vector controlled (TVC) missile, comprising the steps of:

measuring missile bank angle; and adjusting the missile bank angle at a rate proportional to the measured missile bank angle solely by means of pitch and yaw thrust vectors.

* * * * *